US012532290B2

(12) United States Patent
Dutta et al.

(10) Patent No.: US 12,532,290 B2
(45) Date of Patent: Jan. 20, 2026

(54) POSITIONING WITH USER EQUIPMENT (UE) CONTROLLED RECONFIGURABLE INTELLIGENT DEVICE (RID)

(71) Applicant: QUALCOMM Incorporated, San Diego, CA (US)

(72) Inventors: Sourjya Dutta, San Diego, CA (US); Navid Abedini, Basking Ridge, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 18/340,343

(22) Filed: Jun. 23, 2023

(65) Prior Publication Data

US 2024/0430848 A1 Dec. 26, 2024

(51) Int. Cl.
*H04W 64/00* (2009.01)
*H04B 7/04* (2017.01)
*H04L 5/00* (2006.01)

(52) U.S. Cl.
CPC ...... *H04W 64/003* (2013.01); *H04B 7/04013* (2023.05); *H04L 5/0048* (2013.01)

(58) Field of Classification Search
CPC . H04W 64/003; H04W 84/047; H04W 16/26; H04W 64/00; H04B 7/04013; H04L 5/0048
See application file for complete search history.

(56) References Cited

U.S. PATENT DOCUMENTS

| 11,611,870 | B2 * | 3/2023 | Zhou | H04W 8/24 |
| 2024/0118374 | A1 * | 4/2024 | Henninger | G01S 5/0236 |
| 2024/0125890 | A1 * | 4/2024 | Jung | H04B 7/04013 |
| 2024/0402328 | A1 * | 12/2024 | Tayyab | G01S 5/0236 |

FOREIGN PATENT DOCUMENTS

| WO | 2022164596 A1 | 8/2022 |
| WO | 2022187761 A1 | 9/2022 |
| WO | 2022246684 A1 | 12/2022 |

OTHER PUBLICATIONS

International Search Report and Written Opinion—PCT/US2024/027646—ISA/EPO—Sep. 4, 2024.

* cited by examiner

*Primary Examiner* — Kabir A Timory
(74) *Attorney, Agent, or Firm* — Thien T. Nguyen

(57) ABSTRACT

An example method of positioning of a target UE in a presence of one or more RIDs, the method performed by a server and may comprise receiving, from the target UE, information of the one or more distributed RIDs indicating at least one or more positions of the one or more distributed RIDs, wherein the one or more distributed RIDs are used for link enhancement of a wireless link between the target UE and one or more radio access network (RAN) nodes configured for positioning the target UE, and wherein the one or more distributed RIDs are not directly controlled by the server. The method may also comprise positioning the target UE based at least in part on the information of the one or more distributed RIDs.

30 Claims, 10 Drawing Sheets

| Information UE-assisted | |
|---|---|
| SS Reference signal received power (SS-SRP) | Yes |
| SS Reference Signal Received Quality (SS-RSRQ) | Yes |
| CSI Reference signal received power (CSI-RSRP) | Yes |
| CSI Reference Signal Received Quality (CSI-RSRQ) | Yes |
| NR Cell Global Identifier, Physical Cell ID | Yes |

502

| |
|---|
| RID active indication (associated with the RID indices that are controllable by the UE), list of active RID-s during the measurement |
| RID relative/abs location information: A distance (and direction) for each of the active RID during the measurement |
| RID associated delay information: One or more resolvable delays associated with the RID based on the Tx timing of the reference signal/SSB |
| Rx beam info for alt path: The Rx beam associated with the received RS |

POSITIONING WITH USER EQUIPMENT (UE) CONTROLLED RECONFIGURABLE INTELLIGENT DEVICE (RID)

BACKGROUND

1. Field of Disclosure

The present disclosure relates generally to the field of wireless communications, and more specifically to positioning a target User Equipment (UE) using distributed reconfigurable intelligent device(s) RID(s).

2. Description of Related Art

In a wireless communication network, positioning of a receiving device (e.g., a target UE) can involve measurements of a radio frequency (RF) signal (e.g., a wireless reference signal) received by the receiving device. In some instances, RID(s) may be used to enhance the positioning of the target UE.

BRIEF SUMMARY

An example method of positioning of a target UE in a presence of one or more RIDs, the method performed by a server and may comprise receiving, from the target UE, information of the one or more distributed RIDs indicating at least one or more positions of the one or more distributed RIDs, wherein the one or more distributed RIDs are used for link enhancement of a wireless link between the target UE and one or more radio access network (RAN) nodes configured for positioning the target UE, and wherein the one or more distributed RIDs are not directly controlled by the server. The method may also comprise positioning the target UE based at least in part on the information of the one or more distributed RIDs.

An example method of positioning of a target UE in a presence of one or more RIDs, the method performed by the target UE and may comprise performing link enhancement of a wireless link between the target UE and one or more radio access network (RAN) nodes configured for positioning the target UE, wherein the link enhancement is performed using the one or more distributed RIDs, and wherein the one or more distributed RIDs are not directly controlled by a server. The method may also comprise determining a position of the one or more distributed RIDs. The method may further comprise sending, to a server, information of the one or more distributed RIDs indicating at least one or more positions of the one or more distributed RIDs.

An example server for positioning of a target UE in a presence of one or more distributed RIDs comprising one or more transceivers, one or more memories, and one or more processors communicatively coupled with the one or more transceivers and the memories. The one or more processors may be configured to receive, from the target UE, information of the one or more distributed RIDs indicating at least one or more positions of the one or more distributed RIDs, wherein the one or more distributed RIDs are used for link enhancement of a wireless link between the target UE and one or more radio access network (RAN) nodes configured for positioning the target UE, and wherein the one or more distributed RIDs are not directly controlled by the server. The one or more processors may also be configured to position the target UE based at least in part on the information of the one or more distributed RIDs.

An example target UE for positioning in a presence of one or more RIDs comprising one or more transceivers, one or more memories, and one or more processors communicatively coupled with the one or more transceivers and the memories. The one or more processors may be configured to perform link enhancement of a wireless link between the target UE and one or more radio access network (RAN) nodes configured for positioning the target UE, wherein the link enhancement is performed using the one or more distributed RIDs, and wherein the one or more distributed RIDs are not directly controlled by a server. The one or more processors may also be configured to determine one or more positions of the one or more distributed RIDs. The one or more processors may further be configured to send, to a server, information of the one or more distributed RIDs indicating at least one or more positions of the one or more distributed RIDs.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 5B is a diagram of example information reported according to an embodiment.

Figure 1:
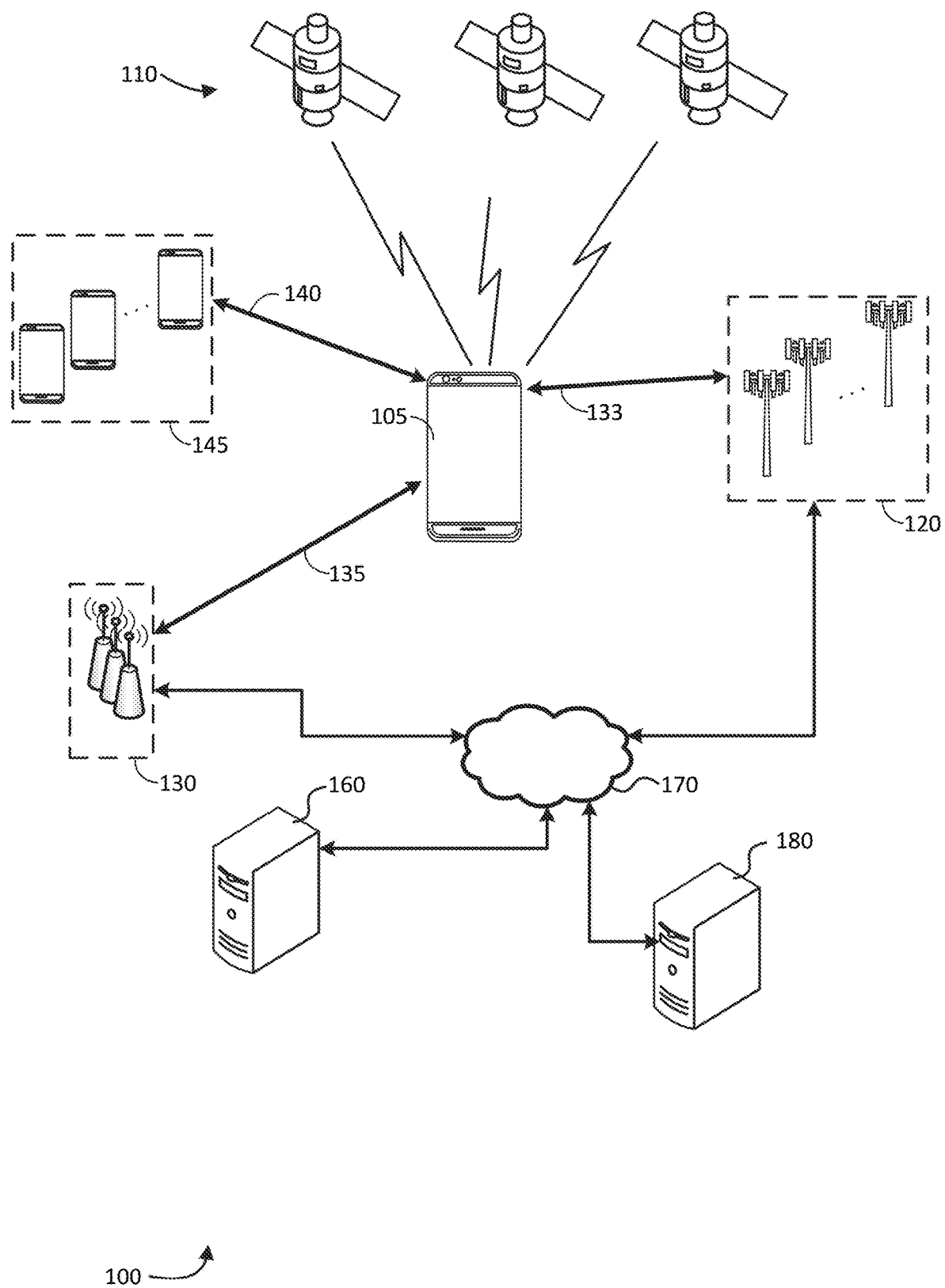
FIG. 1 is a simplified illustration of a positioning system for UE positioning in the presence of one or more distributed RIDs, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE) in a 5G new radio (NR) network. As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may include absolute location determination, relative location determination, ranging, or a combination thereof. Such positioning may include and/or be based on timing, angular, phase, or power measurements, or a combination thereof (which may include RF sensing measurements) for the purpose of location or sensing services.

Various aspects generally relate to positioning of a target UE. Some aspects more specifically relate to the positioning of the target UE in the presence of one or more distributed reconfigurable intelligent devices (RIDs). The term RID, as used herein may include any controllable devices in the medium between a transmitter and a receiver that can improve the link quality. For example, the RID may include passive RIDs that may not need power or control, such as a meta-surface installed on a window for getting rid of outdoor-to-indoor penetration loss and may include active RIDs such as repeaters, reconfigurable intelligent surfaces (IRSs), etc., controlled by a network controller (e.g., a network node, such as a location server and/or a base station) or a distributed controller (e.g., a roadside unit or another UE) for boosting signal strength and/or steering the signals. When the RID is controllable, the controller of the RID (RID-C) may communicate with other network nodes to determine the RID configuration for positioning the target UE.

As will be discussed in detail below, knowledge of the information (e.g., presence, availability, location, etc.) of the RID(s) in the positioning of the target UE is crucial because it may otherwise cause significant positioning errors (will be discussed in detail below). In some instances, if the RID(s) are network-controlled (e.g., directly controlled by a network node), a base station may notify the UEs connected to the base station of the presence of the RID. However, if the RID(s) are not directly controlled by a network node like the location server—instead, they are controlled by distributed controllers such as Roadside Units (RSUs) or other UEs—then the target UE may need to identify and notify the network node about the information of the RID(s).

In some examples, the target UE may determine that one or more distributed RIDs (e.g., not directly controlled by a network node) are in use for link enhancement of wireless link(s) between the target UE and one or more radio access network (RAN) nodes configured for positioning the target UE. The target UE may send to a server information of the one or more distributed RIDs indicating at least one or more positions of the one or more distributed RIDs. The target UE may be positioned based at least in part on the information of the one or more distributed RIDs. For example, the server may obtain one or more link measurements of the wireless link (e.g., from the one or more RAN nodes) and may initiate an uplink (UL) positioning session by determining one or more sounding reference signal (SRS) configurations based on the information of the one or more distributed RIDs, the one or more link measurements, and/or capabilities of the target UE. The one or more SRS configurations may then be transmitted to the one or more RAN nodes and/or the UE for positioning the target UE. In some embodiments, based on the information of the one or more distributed RIDs, the server may also determine distributed RID configuration(s) indicating control information for the target UE to control the one or more distributed RIDs. Consequently, the positioning of the target UE may factor in the presence of the one or more RIDs.

Particular aspects of the subject matter described in this disclosure can be implemented to realize one or more of the following potential advantages. In some examples, by considering the presence of the distributed RID, the described techniques can be used to enhance the positioning performance of the target UE (e.g., increase the positioning accuracy) and/or reduce the interference to the positioning of neighboring UEs that do not use the RID.

FIG. 1 is a simplified illustration of a positioning system 100 in which a UE 105, location server 160, and/or other components of the positioning system 100 can use the techniques provided herein for UE positioning in the presence of one or more distributed RIDs, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, network 170 may comprise any of a variety of wireless and/or wireline networks. Network 170 can, for example, comprise any combination of public and/or private networks, local and/or wide-area networks, and the like. Furthermore, network 170 may utilize one or more wired and/or wireless communication technologies. In some embodiments, network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

Base stations 120 and access points (APs) 130 may be communicatively coupled to network 170. In some embodiments, base station 120s may be owned, maintained, and/or operated by a cellular network provider, and may employ any of a variety of wireless technologies, as described herein below. Depending on the technology of network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing network 170 via a base station 120 using a first communication link 133. Additionally or alternatively, because APs 130 also may be communicatively coupled with network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g., with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a base station).

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by UE 105. In particular, these measurements can provide information regarding the relative distance and/or angle of UE 105 from one or more components in positioning system 100 (e.g., GNSS satellites 110, APs 130, base stations 120). The estimated location of UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of UE 105 may be estimated at least in part based on measurements of RF signals 140 communicated between UE 105 and one or more other UEs 145, which may be mobile or fixed. When one or more other UEs 145 are used in the position determination of a particular UE 105, UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix," "estimated position," "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of another UE 145 at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
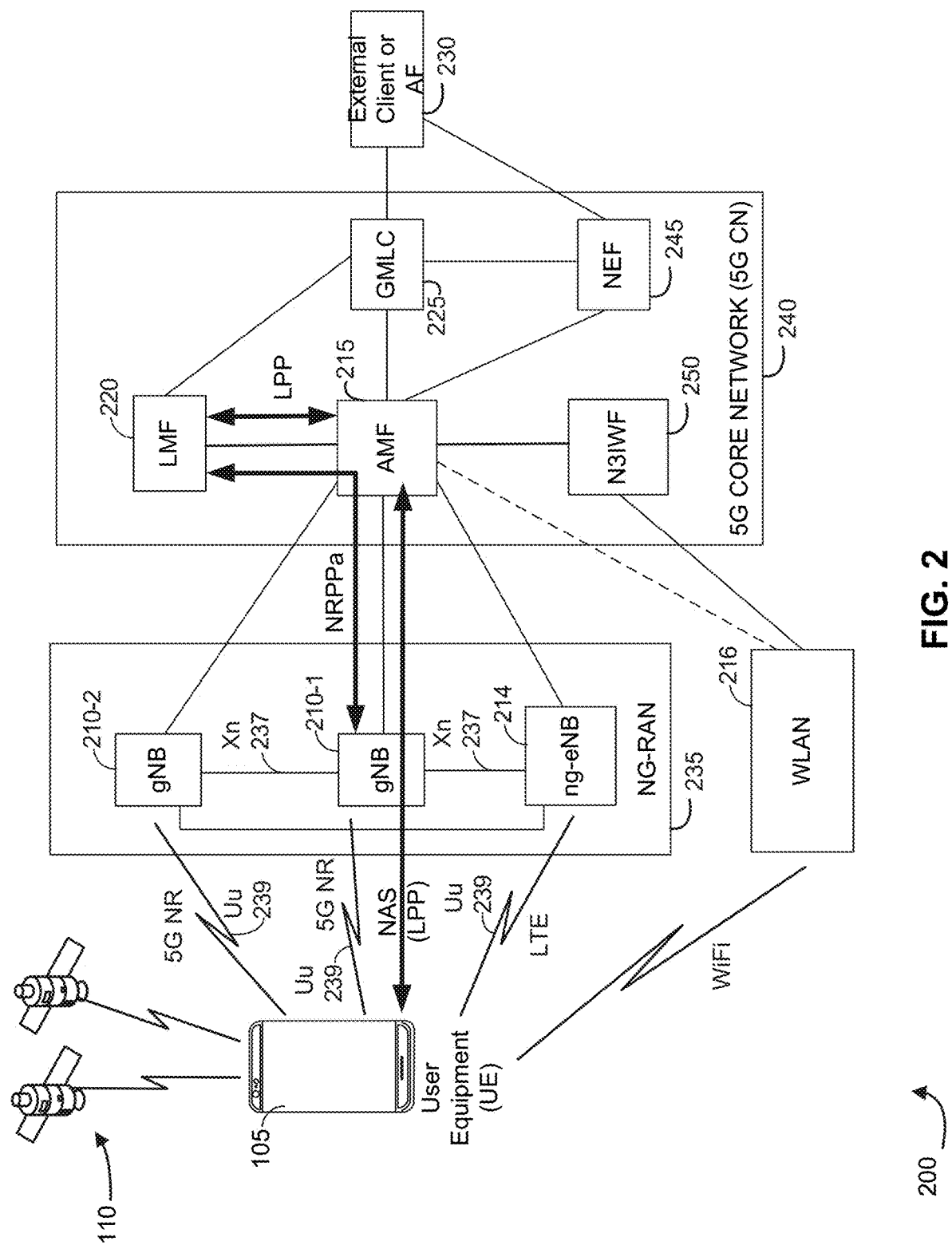
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. 5G NR positioning system 200 may further utilize information from GNSS satellites 110 from a GNSS system like Global Positioning System (GPS) or similar system (e.g., GLONASS, Galileo, Beidou, Indian Regional Navigational Satellite System (IRNSS)). Additional components of 5G NR positioning system 200 are described below. 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

UE 105 may comprise and/or be referred to as a device, a mobile device, a wireless device, a mobile terminal, a terminal, a mobile station (MS), a Secure User Plane Location (SUPL)—Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding UE 105 (e.g., via the GMLC 225). The external client 230 of FIG. 2 may correspond to external client 180 of FIG. 1, as implemented in or communicatively coupled with a 5G NR network.

UE 105 may include a single entity or may include multiple entities, such as in a personal area network where a user may employ audio, video and/or data I/O devices, and/or body sensors and a separate wireline or wireless modem. An estimate of a location of UE 105 may be referred to as a location, location estimate, location fix, fix, position, position estimate, or position fix, and may be geodetic, thus providing location coordinates for UE 105 (e.g., latitude and longitude), which may or may not include an altitude component (e.g., height above sea level, height above or depth below ground level, floor level or basement level). Alternatively, a location of UE 105 may be expressed as a civic location (e.g., as a postal address or the designation of some point or small area in a building such as a particular room or floor). A location of UE 105 may also be expressed as an area or volume (defined either geodetically or in civic form) within which UE 105 is expected to be located with some probability or confidence level (e.g., 67%, 95%, etc.). A location of UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g., for latitude, longitude and altitude above or below mean sea level).

Base stations in NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between UE 105 and one or more of the gNBs 210, which may provide wireless communications access to the 5G CN 240 on behalf of the UE 105 using 5G NR. The wireless interface between base stations (gNBs 210 and/or ng-eNB 214) and UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

gNBs 210 and ng-eNB 214 can communicate with an AMF 215, which, for positioning functionality, communicates with an LMF 220. AMF 215 may support mobility of UE 105, including cell change and handover of UE 105 from an access node (e.g., gNB 210, ng-eNB 214, or WLAN 216) of a first RAT to an access node of a second RAT. AMF 215 may also participate in supporting a signaling connection to the UE 105 and possibly data and voice bearers for the UE 105. The LMF 220 may support positioning of UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. LMF 220 may also process location service requests for the UE 105, e.g., received from AMF 215 or from GMLC 225. LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at UE 105 (e.g., by measuring downlink PRS (DL-PRS) signals transmitted by wireless nodes such as gNBs 210, ng-eNB 214 and/or WLAN 216, and/or using assistance data provided to UE 105, e.g., by LMF 220).

The Gateway Mobile Location Center (GMLC) 225 may support a location request for UE 105 received from an external client 230 and may forward such a location request to AMF 215 for forwarding by the AMF 215 to LMF 220. A location response from LMF 220 (e.g., containing a location estimate for UE 105) may be similarly returned to GMLC 225 either directly or via the AMF 215, and GMLC 225 may then return the location response (e.g., containing the location estimate) to external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and LMF 220, and/or between an ng-eNB 214 and LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between LMF 220 and AMF 215 using messages for service-based operations (e.g., based on the Hypertext Transfer Protocol (HTTP)) and may be transferred between AMF 215 and UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and LMF 220, via AMF 215 and N3IWF 250 to support network-based positioning of UE 105 and/or transfer of other location information from WLAN 216 to LMF 220. Alternatively, NRPPa messages may be transferred between N3IWF 250 and LMF 220, via AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between UE 105 and LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of UE 105 also may be categorized as UL, DL, or DL-UL based, depending on the types of signals used for positioning. If, for example, positioning is based solely on signals received at UE 105 (e.g., from a base station or other UE), the positioning may be categorized as DL based. On the other hand, if positioning is based solely on signals transmitted by UE 105 (which may be received by a base station or other UE, for example), the positioning may be categorized as UL based. Positioning that is DL-UL based includes positioning, such as RTT-based positioning, that is based on signals that are both transmitted and received by UE 105. Sidelink (SL)—assisted positioning comprises signals communicated between UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
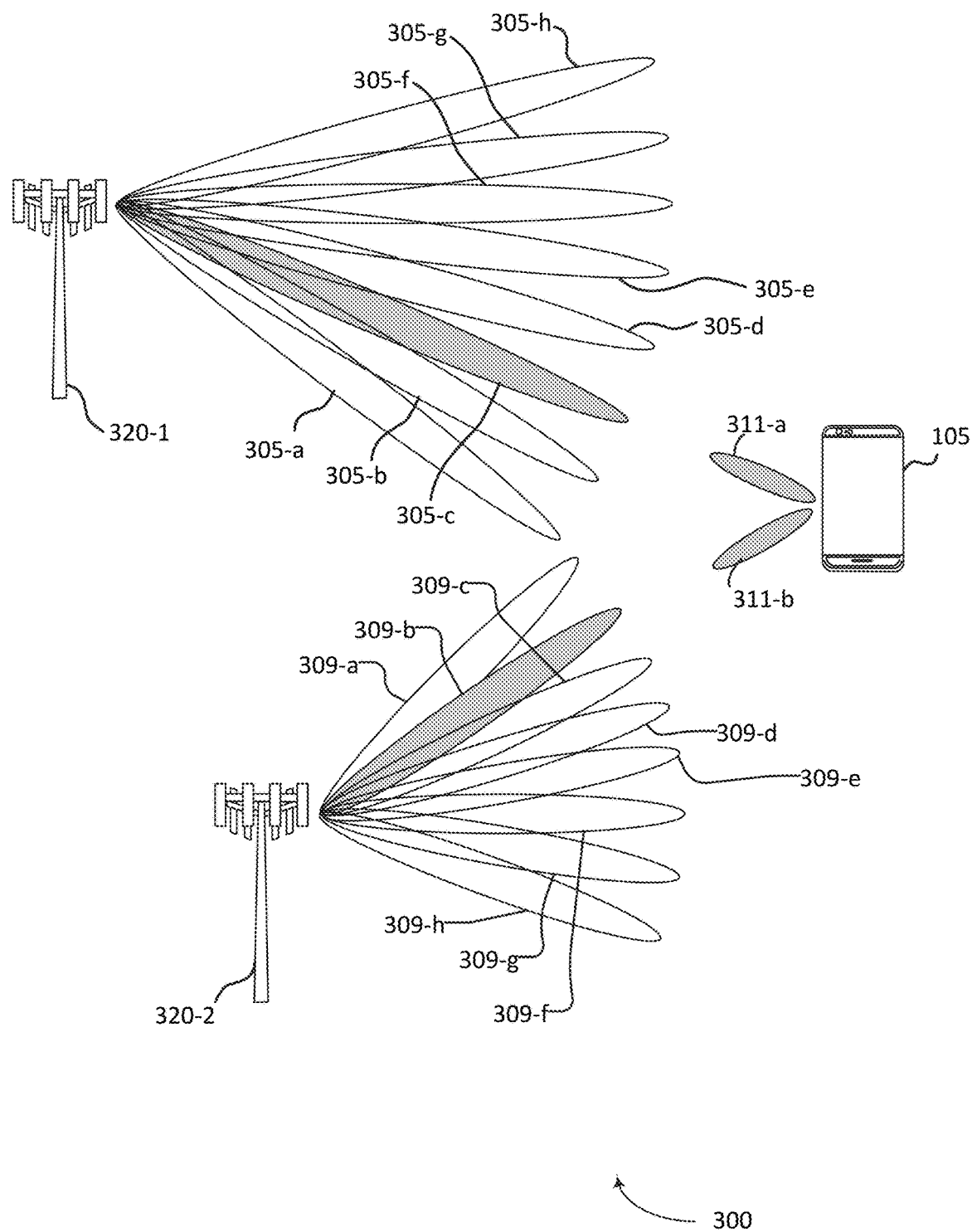
FIG. 3 is a diagram illustrating beamforming in a 5G NR positioning system.

FIG. 3 is a diagram illustrating a simplified environment 300 including two TRPs 320-1 and 320-2 (which may correspond to base stations 120 of FIG. 1 and/or gNBs 210 and/or ng-eNB 214 of FIG. 2) with antenna arrays that can perform beamforming to produce directional beams for transmitting and/or receiving reference signals. FIG. 3 also illustrates a UE 105, which may also use beamforming for transmitting and/or receiving reference signals. Such directional beams are used in 5G NR wireless communication networks. Each directional beam may have a beam width centered in a different direction, enabling different beams of a TRP 320 to correspond with different areas within a coverage area for TRP 320.

Different modes of operation may enable TRPs 320-1 and 320-2 to use a larger or smaller number of beams. For example, in a first mode of operation, a TRP 320 may use 16 beams, in which case each beam may have a relatively wide beam width. In a second mode of operation, a TRP 320 may use 64 beams, in which case each beam may have a relatively narrow beam width. Depending on the capabilities of a TRP 320, the TRP may use any number of beams TRP 320 may be capable of forming. The modes of operation and/or number of beams may be defined in relevant wireless standards and may correspond to different directions in either or both azimuth and elevation (e.g., horizontal and vertical directions). Different modes of operation may be used to transmit and/or receive different signal types. Additionally or alternatively, UE 105 may be capable of using different numbers of beams, which may also correspond to different modes of operation, signal types, etc.

In some situations, a TRP 320 may use beam sweeping. Beam sweeping is a process in which TRP 320 may send an RF signal in different directions using different respective beams, often in succession, effectively "sweeping" across a coverage area. For example, a TRP 320 may sweep across 120 or 360 degrees in an azimuth direction, for each beam sweep, which may be periodically repeated. Each direction beam can include an RF reference signal (e.g., a PRS resource), where base station 120-1 produces a set of RF reference signals that includes Tx beams 305-*a*, 305-*b*, 305-*c*, 305-*d*, 305-*e*, 305-*f*, 305-*g*, and 305-*h*, and the base station 120-2 produces a set of RF reference signals that includes Tx beams 309-*a*, 309-*b*, 309-*c*, 309-d, 309-*e*, 309-*f*, 309-*g*, and 309-*h*. As noted, because UE 105 may also include an antenna array, it can receive RF reference signals transmitted by base stations 120-1 and 120-2 using beamforming to form respective receive beams (Rx beams) 311-*a* and 311-*b*. Beamforming in this manner (by base stations 120 and optionally by UEs 105) can be used to make communications more efficient. They can also be used for other purposes, including taking measurements for position determination (e.g., AoD and AoA measurements).

Figure 4:
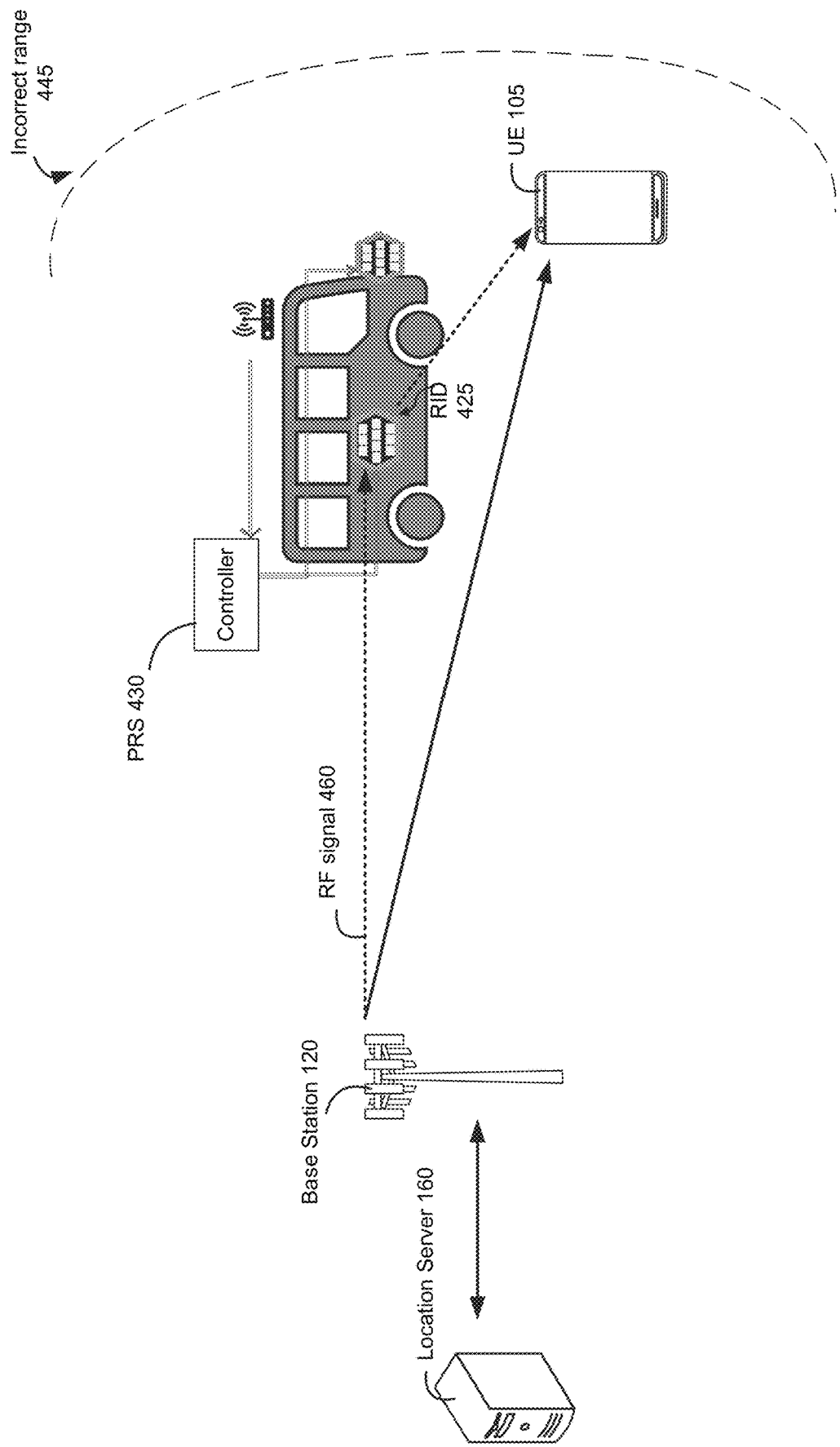
FIG. 4 is a simplified diagram illustrating how one or more distributed RIDs may facilitate the transmission of an RF signal in UE positioning according to an embodiment.

FIG. 4 is a simplified diagram illustrating how one or more distributed RIDs may facilitate the transmission of an RF signal in UE positioning according to an embodiment. Specifically, in the given examples, an RF signal 460 is transmitted by base station 120 (which may comprise a base station for UE 105) and received by UE 105 (a target UE to be positioned) with the presence of one or more distributed RIDs 425 (only one RID 425 is shown in FIG. 4 for ease of illustration). For example, RF signal 460 may be transmitted from base station 120, redirected and/or boosted by one or more distributed RIDs 425, and received by UE 105, where the positioning of UE 105 may be performed based on RF signal 460 transmitted. As noted, in some embodiments, RF signal 460 may be a reference signal specialized in facilitating positioning (e.g., a PRS), which may be a signal that is not otherwise explicitly defined under 5G (or other 3GPP) standards.

In some embodiments, measurements (e.g., TDOA, AoA, AoD, RSTD, RTT, and/or multi-cell RTT) may be determined based on RF signal 460 received by UE 105. In some embodiments, the positioning processes may be facilitated with the use of a location server 160. Depending on the type of positioning (e.g., UE-based positioning or UE-assisted positioning) and/or the desired functionality, UE 105 or location server 160 may be used to determine/calculate the location of UE 105 based on the measurements.

In some embodiments, one or more distributed RIDs 425 may be meta-surfaces, reconfigurable intelligent surfaces, or reconfigurable reflect arrays/meta-surfaces controlled by a distributed controller 430 (e.g., a controller not being a network node) that are capable of communicating with other network nodes (e.g., base station 120 and/or location server 160) for determining the RID configuration and may be capable of communicating with other UEs through sidelink communication channels. As noted above, one or more distributed RIDs 425, along with distributed controller 430, may be on RSUs or large vehicles like buses, trucks, etc., a base station (e.g., the central controller function being performed by a gNB), or another UE. As such, one or more distributed RIDs 425 can enable wireless coverage of base station 120 (or, more broadly, the wireless network of base station 120) to extend to otherwise unreachable areas and/or increase the link quality of the communication links established between the UEs and RAN nodes used for positioning the UE including base station 120 (e.g., performing link enhancement).

In some embodiments, one or more distributed RIDs 425 may include a software-controlled reflection/scattering profile configured to redirect wireless signals toward UE 105 in real-time. Additionally or alternatively, one or more distributed RIDs 425 may act as a repeater by receiving signals transmitted by a base station 120 and directing them toward a UE 105. (As used herein, "directing," "redirecting," "reflecting," and similar terms used when referring to the functionality of one or more distributed RIDs 425 may refer to the reflecting and/or repeating functionality of a RID).

In some embodiments, one or more distributed RIDs 425 may be used for link enhancement of a wireless link between the target UE (e.g., UE 105) and one or more RAN nodes configured for positioning the target UE (e.g., access nodes, which may include NR NodeB (gNB) 210-1 and 210-2, ng-eNB 214, and/or WLAN 216 in FIG. 2 depending on the positioning methods). UE 105 may communicate with the controller of one or more distributed RIDs 425 over sidelink communication channel(s) to dynamically configure one or more distributed RIDs 425. UE 105 may also perform the positioning with the base station (e.g., base station 120) using one or more distributed RIDs 425 for improving the accuracy of the positioning. Because one or more distributed RIDs 425 are not directly controlled by a network node (e.g., the server facilitating the positioning (e.g., location server 160)), UE 105 may need to notify the network nodes information of the one or more distributed RIDs 425 to avoid measurements error when positioning UE 105. For example, if using TDOA measurements for positioning UE 105, without the knowledge of the presence of one or more distributed RIDs 425, incorrect positioning range (e.g., incorrect range 445) with regard to base station 120 may be caused by taking the redirected path (e.g., using the distributed RID) as a direct path between base station 120 to the target UE 105.

Accordingly, in some embodiments, as will be discussed in detail below, after receiving from UE 105, information of one or more distributed RIDs 425 indicating at least e.g., one or more positions of one or more distributed RIDs 425 (e.g., including absolute positions of one or more distributed RIDs 425 and/or relative positions of one or more distributed RIDs 425 with respect to target UE 105), location server 160 may obtain one or more link measurements (e.g., indicating physical cell identity (PCI), synchronization signal block (SSB)—indices and/or the channel state information (CSI) resources received over the alternate path(es) through one or more distributed RIDs 425). In some embodiments, the information of one or more distributed RIDs 425 may also indicate target UE 105 is capable of controlling one or more distributed RIDs 425, scheduling information of one or more distributed RIDs 425 indicating time and frequency resources over which one or more distributed RIDs 425 are available for signal amplification or redirection, hardware capabilities of one or more distributed RIDs 425, additional processing delays associated with one or more distributed RIDs 425, whether one or more distributed RIDs 425 are available for UL transmission or DL transmission, relative mobility between one or more distributed RIDs 425 and target UE 105, or any combination thereof. Additionally or alternatively, in some embodiments, location server 160 may receive from the one or more RAN nodes additional information of one or more distributed RIDs 425 e.g., indicating updated positions of one or more distributed RIDs 425.

Location server 160 may also initiate a UL positioning session by determining one or more SRS configurations based on the information of one or more distributed RIDs 425, the one or more link measurements, and/or capabilities of target UE 105, and may send a message indicating the one or more SRS configurations to the one or more RAN nodes. In some embodiments, the message may further indicate receiver configurations corresponding to the one or more SRS configurations and/or an association between the one or more reference signals and the one or more SRS configurations, determined based at least in part on the capabilities of UE 105.

In some embodiments, location server 160 may also associate multiple SRS configurations to a reference signal index, wherein at least one of the multiple SRS configurations includes an indication to combine measurements from multiple resources allocated to the reference signal index, and may transmit to UE 105, one or more RID configurations associated with the one or more reference signals, wherein the one or more RID configurations are mapped to the information of the one or more distributed RIDs received from the UE.

In some embodiments, location server 160 may also receive from target UE 105, DL reference signal measurements, where each of the downlink reference signal measurements is associated with a notification indicating whether one or more distributed RIDs 425 are used during the downlink reference signal measurement, an estimate time delay associated with the downlink reference signal measurement, a receiver side beam over which the downlink reference signal measurement is received, or any combination thereof.

In some embodiments, location server 160 may also determine RID configuration(s) based at least in part on the information of one or more distributed RIDs 425 for positioning UE 105. For example, location server 160 may determine a first RID configuration based at least in part on the information of one or more distributed RIDs 425 for positioning UE 105. The first RID configuration may be communicated directly to the controller of one or more distributed RIDs 425 or may be shared with UE 105, which may redirect the first RID configuration to the controller of one or more distributed RIDs 425 over sidelink communication channel(s). Location server 160 may also determine a second RID configuration for reducing interference associated with the positioning of UE 105 caused by one or more distributed RIDs 425 (e.g., based on an ON-OFF schedule of one or more distributed RIDs 425). In some embodiments, location server 160 may determine a list of neighboring UEs that locates within a predetermined threshold distance from one or more distributed RIDs 425 and/or UE 105 and notify the neighboring UEs availability of one or more distributed RIDs 425 (e.g., transmit the second RID configuration to the neighboring UEs directly or through UE 105). In some embodiments, the neighboring UEs may be positioned in accordance with the second RID configuration.

In some embodiments, as will be discussed in detail below, location server 160 may determine the first RID configuration or the second RID configuration based on usage information of one or more distributed RIDs 425 indicating (1) time and frequency resources over which one or more distributed RIDs 425 are available for signal amplification or redirection, (2) a directional relationship between a primary beam pair link between UE 105 and base station 120 and a beam pair link through one or more distributed RIDs 425, or any combination thereof.

It can be noted that although a single base station 120, a single distributed RID 425, and a single UE 105 are illustrated in FIG. 4, embodiments are not so limited. According to some embodiments, configurations may be used in which there are a plurality of base stations 120 (transmitters), a plurality of distributed RIDs 425, and/or a different number of UEs 105 (receivers). Furthermore, in instances in which multiple receiving devices are used, a single RID may reflect signals to multiple receiving devices, and/or multiple IRSs may be used to reflect or refract signals to multiple receiving devices.

Figure 5A:
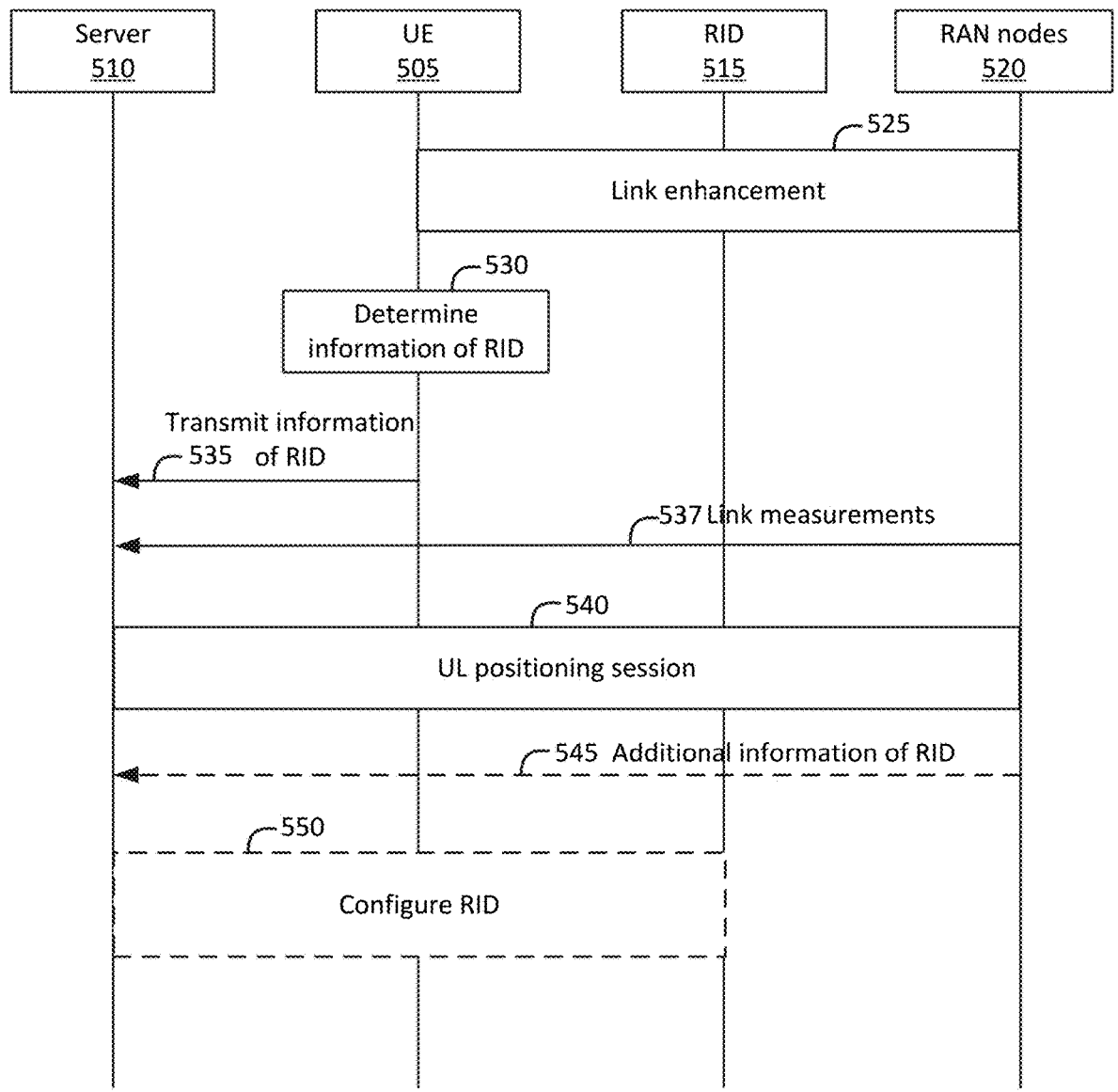
FIG. 5A is a call-flow diagram illustrating how positioning of a target UE may be performed in the presence of one or more distributed RIDs according to an embodiment.

FIG. 5A is a call-flow diagram illustrating how positioning of a target UE may be performed in the presence of one or more RIDs according to an embodiment. In some embodiments, the process may be performed between a server 510, target UE 505, one or more distributed RIDs 515, and in some embodiments, one or more RAN nodes 520 (e.g., configured for positioning target UE 505). In some embodiments, server 510 may correspond to location server 160 in FIGS. 1 and 4. Target UE 505 may correspond to UE 105 in FIGS. 1 and 4 and may be any UE that is in the vicinity of one or more distributed RIDs 515 and is capable of communicating with distributed controller(s) of one or more distributed RIDs 515 over sidelink communication channel(s). One or more distributed RIDs 515 may correspond to one or more distributed RIDs 425 in FIG. 4. One or more RAN nodes 520 may correspond to access nodes, which may include NR NodeB (gNB) 210-1 and 210-2, ng-eNB 214, and/or WLAN 216 in FIG. 2 depending on the positioning methods.

As illustrated in FIG. 5A, starting at block 525, one or more distributed RIDs 515 may be used for link enhancement of wireless links between target UE 505 and one or more RAN nodes 520. For example, one or more distributed RIDs 515 may be used for adjusting signal strength, quality, and/or direction of the signals communicated between target UE 505 and one or more RAN nodes 520. Because one or more distributed RIDs 515 are not directly controlled by server 510, as noted above, positioning target UE 505 (e.g., reporting positioning measurements) without notifying server 510 of the information of one or more distributed RIDs 515 may lead to incorrect positioning result (e.g., incorrect range 445 in FIG. 4).

Target UE 505 may determine that one or more distributed RIDs 515 are not directly controlled by a network node (e.g., server 510) and may be dynamically configured by target UE 505, e.g., over a sidelink communication channel established with the distributed controller(s) of one or more distributed RIDs 515.

At block 530, target UE 505 may determine information of one or more distributed RIDs 515, indicating at least, e.g. one or more positions of one or more distributed RIDs 515. As noted above, in some embodiments, the one or more positions may include absolute positions of one or more distributed RIDs 515 and/or relative positions of one or more distributed RIDs 515 with respect to target UE 505. For example, target UE 505 may execute local positioning for estimating the distance between target UE 505 and the distributed controller(s) of one or more distributed RIDs 515 and may receive a relative location of one or more distributed RIDs 515 from the distributed controller(s). In some embodiments, when estimating the distance between target UE 505 and the distributed controller(s) of one or more distributed RIDs 515, the estimation could be performed based on pathloss estimate, packet round trip time, pilot delay profile, etc. The direction may be determined based on the beam used to receive/transmit positioning signals from/ to the distributed controller(s), the sidelink zone ID of the distributed controller(s), and the sidelink zone ID of target UE 505, and/or other inexact positioning information if available (e.g., GNSS positioning information of target UE 505 and/or the distributed controller(s)). In some embodiments, the local positioning for estimating the distance between target UE 505 and the distributed controller(s) of one or more distributed RIDs 515 may be performed over a side channel that target UE 505 and the distributed controller(s) of one or more distributed RIDs 515 are communicating over (e.g., side link(s), WLAN, Bluetooth, etc.).

As will be disclosed in detail below, in some embodiments, the information of one or more distributed RIDs 515 may further indicate target UE 505 is capable of controlling one or more distributed RIDs 515, scheduling information of one or more distributed RIDs 515 indicating time and frequency resources over which one or more distributed RIDs 515 are available for signal amplification or redirection, hardware capabilities of one or more distributed RIDs 515, additional processing delays associated with one or more distributed RIDs 515, whether one or more distributed RIDs 515 are available for UL transmission or DL transmission, relative mobility between one or more distributed RIDs 515 and target UE 505, or any combination thereof. In some embodiments, the relative mobility information may include notification(s) of relative mobility, speed of approach/departure, the direction of approach and departure, times scales related to mobility, etc.

At arrow 535, target UE 505 may transmit the information of one or more distributed RIDs 515 to server 510.

In some embodiments, at arrow 537, server 510 may obtain one or more link measurements, indicating such as PCI, SSB-indices, and/or the CSI resources received over the alternate path(es) through one or more distributed RIDs 515 from one or more RAN nodes 520. In some embodiments, the one or more link measurements may be used for directional communication.

At block 540, server 510 may initiate a UL positioning session with target UE 505 and one or more RAN nodes 520 based at least in part on the information of one or more distributed RIDs 515. For example, server 510 may determine one or more SRS configurations based on the information of one or more distributed RIDs 515, the one or more link measurements, and/or capabilities of target UE 505 and may send a message indicating the one or more SRS configurations to one or more RAN nodes 520 based on the capability exchange with target UE 505. In some embodiments, the message may further indicate receiver configurations corresponding to the one or more SRS configurations and/or an association between the one or more reference signals and the one or more SRS configurations, determined based at least in part on the capabilities of target UE 505.

In some embodiments, server 510 may also associate multiple SRS configurations to a reference signal index, wherein at least one of the multiple SRS configurations includes an indication to combine measurements from multiple resources allocated to the reference signal index. For example, a "no filtering" bit may be included in the SRS configuration to indicate that the gNB (e.g., one of one or more RAN nodes 520) does not combine measurements over these multiple resources associated with the same SSB/CSI-RS index.

Additionally or alternatively, in some embodiments, at arrow 545, server 510 may receive from one or more RAN nodes 520 additional information of one or more distributed RIDs 515 indicating, e.g. updated positions and/or position refinement notifications of one or more distributed RIDs 515. In some embodiments, the RAN nodes providing the additional information may be RAN nodes other than one or more RAN nodes 520 (e.g., RAN nodes not being used for positioning target UE 505).

Server 510 may further include RID information element(s) to be transmitted to target UE 505 in the message where the RID information may instruct target UE 505 to select a RID configuration for the SRS transmission. In some embodiments, the RID configuration may be mapped to the information of one or more distributed RIDs 525 transmitted from target UE 505 to server 510 in the initial capability exchange message. For example, the mapping may be represented as: [SRS-1: RID-2, SSB-3: RID4, SSB 6], [SRS-2: RID-2.SSB3], [SRS-3: RID4, SSB 6] etc. In some embodiments, the information may be transmitted to target UE 505 with the SRS configuration by one of one or more RAN nodes 520 (e.g., without making changes).

In some embodiments, target UE 505 may be configured with one or more SRS resources by one of one or more RAN nodes 520. For example, target UE 505 may be configured according to the SRS configurations and may send control information to the distributed controller of one or more distributed RIDs 525 for each of the SRS transmission occasions (e.g., during which target UE 505 may transmit the UL SRS).

In some embodiments, server 510 may also receive from target UE 105, DL reference signal measurements (e.g., target UE 105 may report each positioning determination to server 510), where each of the DL reference signal measurements is associated with a notification indicating whether one or more distributed RIDs 515 are used during the downlink reference signal measurement, an estimate time delay associated with the downlink reference signal measurement, a receiver side beam over which the downlink reference signal measurement is received, or any combination thereof. In some embodiments, as shown in FIG. 5B, for an Enhanced Cell ID measurement, the information shown in Table 504 may be appended to the information shown in Table 502 when target UE 105 reports to server 510.

In some embodiments, at block 550, server 510 may configure one or more distributed RIDs 515 for positioning target UE 505 by transmitting RID configuration to target UE 505. For example, the RID configuration may be determined based at least in part on the information of one or more distributed RIDs 515, indicating control information for target UE 505 to control the distributed RID. Server 510 may send the distributed RID configuration to target UE 505 either in the capability exchange procedures or during intermediate steps of the positioning procedures. If the distributed RID configuration is sent in the capability exchange step, the configuration may apply to the entire measurement process. Additionally or alternatively, if the distributed RID configuration is sent in the intermediate steps (e.g., either over non-access stratum (NAS) or through the gNB), the distributed RID configuration may apply to the corresponding reference signal transmission.

Figure 6:
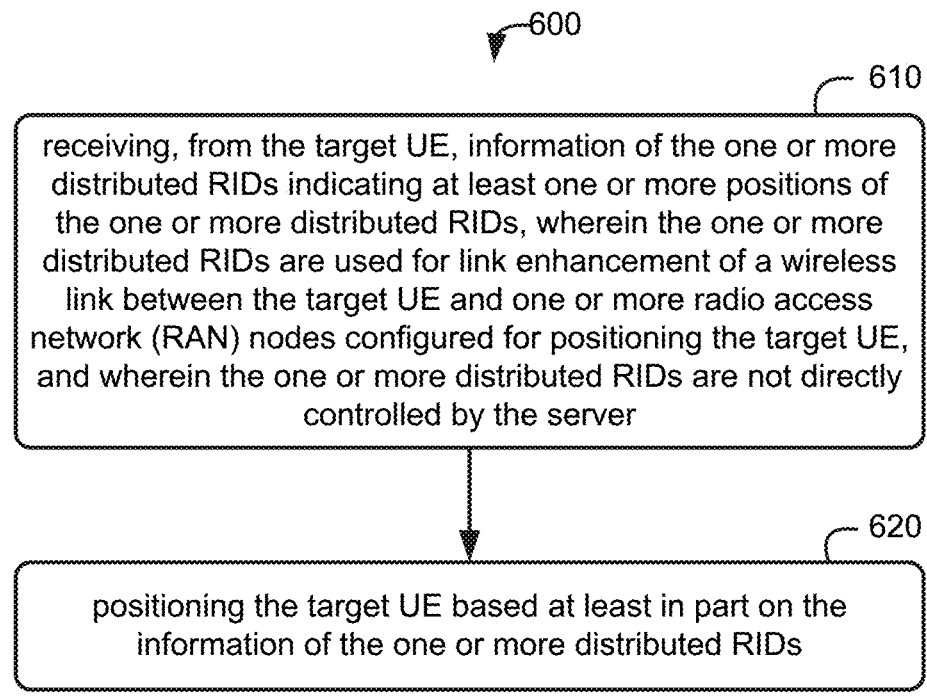
FIG. 6 is a flow diagram of a method for positioning of a target UE in the presence of one or more distributed RIDs, which is performed by a server, according to some embodiments.
Figure 8:
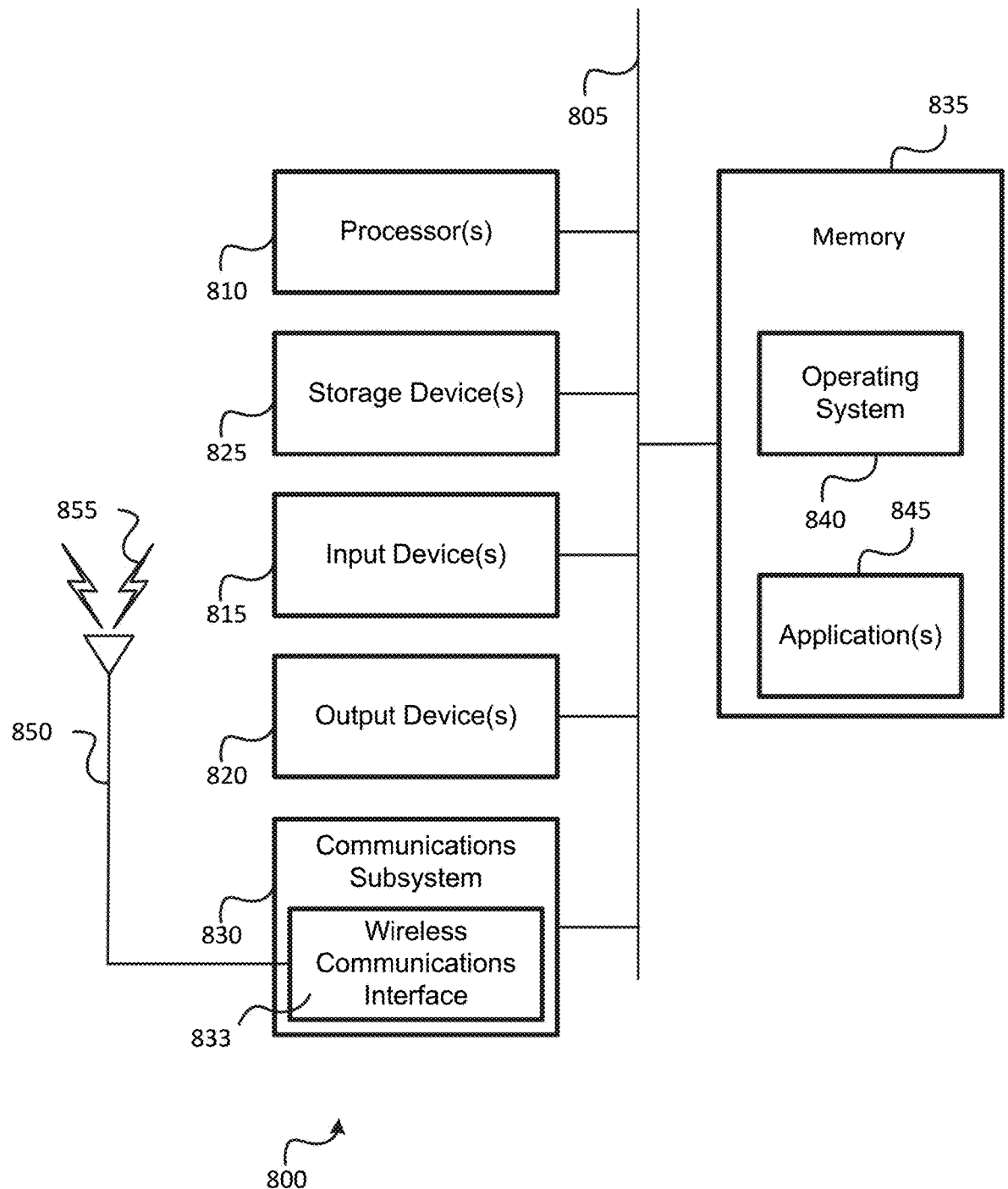
FIG. 8 is a block diagram of an embodiment of a computer system, which can be utilized in embodiments as described herein.

FIG. 6 is a flow diagram of a method 600 for positioning of a target UE (e.g., UE 105 in FIG. 1, and/or target UE 505 in FIG. 5) in the presence of one or more distributed RIDs (e.g., one or more distributed RIDs 425 in FIG. 4 and/or one or more distributed RIDs 515 in FIG. 5A), which is performed by a server, according to some embodiments. In some embodiments, the server may correspond to location server 160 in FIG. 1 and/or server 510 in FIG. 5. Means/structure for performing the functionality illustrated in one or more of the blocks shown in FIG. 8 may be performed by hardware and/or software components of a computer system, as described herein. Example components of a computer system are illustrated in FIG. 8, which are described in more detail below.

At block 610, the functionality comprises receiving, from the target UE, information of the one or more distributed RIDs indicating at least one or more positions of the one or more distributed RIDs, wherein the one or more distributed RIDs are used for link enhancement of a wireless link between the target UE and one or more radio access network (RAN) nodes configured for positioning the target UE (e.g., access nodes, which may include NR NodeB (gNB) 210-1 and 210-2, ng-eNB 214, and/or WLAN 216 in FIG. 2 depending on the positioning methods), and wherein the one or more distributed RIDs are not directly controlled by the server.

As noted above, the one or more distributed RIDs may be used for adjusting signal strength, quality, and/or direction of the signals communicated between the target UE and the one or more RAN nodes.

The target UE may determine that the one or more distributed RIDs is not directly controlled by a network node (e.g., the server) and may be dynamically configured by the target UE, e.g. over a sidelink communication channel established with the distributed controller(s) of the one or more distributed RIDs.

As noted above, in some embodiments, the one or more positions indicated in the information of the one or more distributed RIDs may include absolute positions of the one or more distributed RIDs and/or relative positions of the one or more distributed RIDs with respect to the target UE. For example, the target UE may execute local positioning for estimating the distance between the target UE and the distributed controller(s) of the one or more distributed RIDs and may receive a relative location of the one or more distributed RIDs from the distributed controller(s). In some embodiments, when estimating the distance between the target UE and the distributed controller(s) of the one or more distributed RIDs, the estimation could be performed based on pathloss estimate, packet round trip time, pilot delay profile, etc. The direction may be determined based on the beam used to receive/transmit positioning signals from/to the distributed controller(s), the sidelink zone ID of the distributed controller(s) and the sidelink zone ID of the target UE, and/or other inexact positioning information if available (e.g., GNSS positioning information of the target UE and/or the distributed controller(s)). In some embodiments, the local positioning for estimating the distance between the target UE and the distributed controller(s) of the one or more distributed RIDs may be performed over a side channel that the target UE and the distributed controller(s) of the one or more distributed RIDs are communicating over (e.g., side link(s), WLAN, Bluetooth, etc.).

In some embodiments, the information of the one or more distributed RIDs may further indicate the target UE is capable of controlling the one or more distributed RIDs, scheduling information of the one or more distributed RIDs indicating time and frequency resources over which the one or more distributed RIDs are available for signal amplification or redirection, hardware capabilities of the one or more distributed RIDs, additional processing delays associated with the one or more distributed RIDs, whether the one or more distributed RIDs are available for UL transmission or DL transmission, relative mobility between the one or more distributed RIDs and the target UE, or any combination thereof. In some embodiments, the relative mobility information may include notification(s) of relative mobility, speed of approach/departure, direction of approach and departure, times scales related to mobility, etc.

Figure 9:
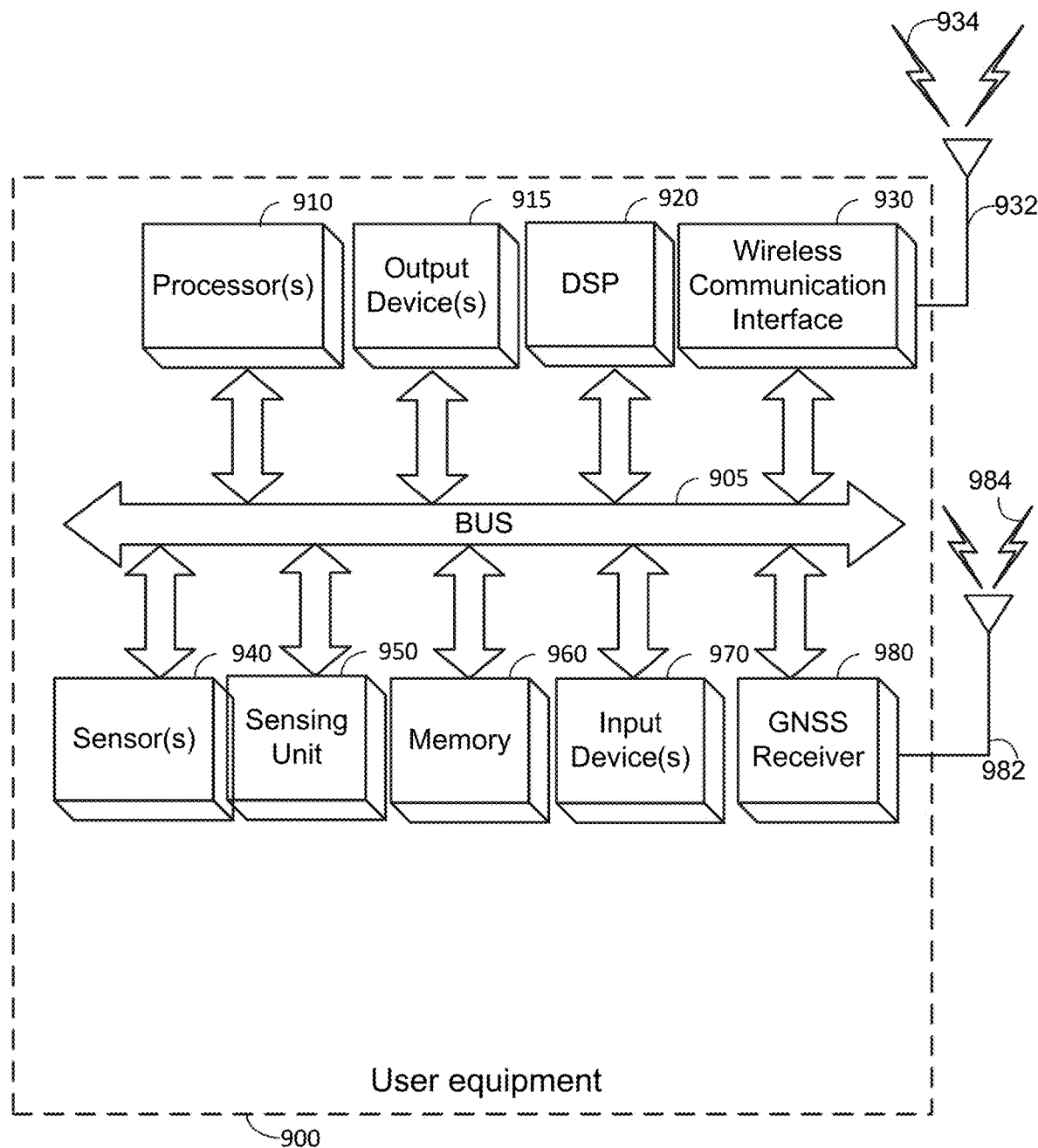
FIG. 9 is a block diagram of an embodiment of a UE, which can be utilized in embodiments as described herein.

Means for performing functionality at block 610 may comprise a bus 905, processor(s) 910, communications subsystem 930, memory 935, and/or other components of computer system 900, as illustrated in FIG. 9.

At block 620, the functionality comprises positioning the target UE based at least in part on the information of the one or more distributed RIDs.

Means for performing functionality at block 620 may comprise a bus 905, processor(s) 910, communications subsystem 930, memory 935, and/or other components of computer system 900, as illustrated in FIG. 9.

In some embodiments, method 600 may further include obtaining one or more link measurements indicating, such as PCI, SSB-indices and/or the CSI resources received over the alternate path(es) through one or more distributed RIDs 515 from one or more RAN nodes 520. In some embodiments, the one or more link measurements may be used for directional communication.

In some embodiments, method 600 may further include initiating a UL positioning session with the target UE and the one or more RAN nodes based at least in part on the information of the one or more distributed RIDs. For example, the server may determine one or more SRS configurations based on the information of the one or more distributed RIDs, the one or more link measurements, and/or capabilities of the target UE, and may send a message indicating the one or more SRS configurations to the one or more RAN nodes based on the capability exchange with the target UE. In some embodiments, the message may further indicate receiver configurations corresponding to the one or more SRS configurations and/or an association between the one or more reference signals and the one or more SRS configurations, determined based at least in part on the capabilities of the target UE.

In some embodiments, the server may also associate multiple SRS configurations to a reference signal index, wherein at least one of the multiple SRS configurations includes an indication to combine measurements from multiple resources allocated to the reference signal index. For example, a "no filtering" bit may be included in the SRS configuration to indicate that the gNB (e.g., one of the one or more RAN nodes) does not combine measurements over these multiple resources associated with the same SSB/CSI-RS index.

In some embodiments, method 600 may further include receiving from the one or more RAN nodes additional information of the one or more distributed RIDs indicating e.g., updated positions and/or position refinement notifications of the one or more distributed RIDs. In some embodiments, the RAN nodes providing the additional information may be RAN nodes other than the one or more RAN nodes (e.g., RAN nodes not being used for positioning the target UE).

The server may further include RID information element(s) to be transmitted to the target UE in the message where the RID information may instruct the target UE to select a RID configuration for the SRS transmission. In some embodiments, the RID configuration may be mapped to the information of the one or more distributed RIDs transmitted from the target UE to the server in the initial capability exchange message. For example the mapping may be represented as: [SRS-1: RID-2, SSB-3: RID4, SSB 6], [SRS-2: RID-2.SSB3], [SRS-3: RID4, SSB 6] etc. In some embodiments, the information may be transmitted to the target UE with the SRS configuration by the one of the one or more RAN nodes (e.g., without making changes).

In some embodiments, the server may also receive from the target UE, DL reference signal measurements (e.g., the target UE may report each positioning determination to the server), where each of the DL reference signal measurements is associated with a notification indicating whether the one or more distributed RIDs are used during the downlink reference signal measurement, an estimate time delay associated with the downlink reference signal measurement, a receiver side beam over which the downlink reference signal measurement is received, or any combination thereof.

In some embodiments, the server may configure the one or more distributed RIDs for positioning target UE by transmitting RID configuration to the target UE. For example, the RID configuration may be determined based at least in part on the information of the one or more distributed RIDs, indicating control information for the target UE to control the distributed RID. The server may send the distributed RID configuration to the target UE either in the capability exchange procedures or during intermediate steps of the positioning procedures.

Figure 7:
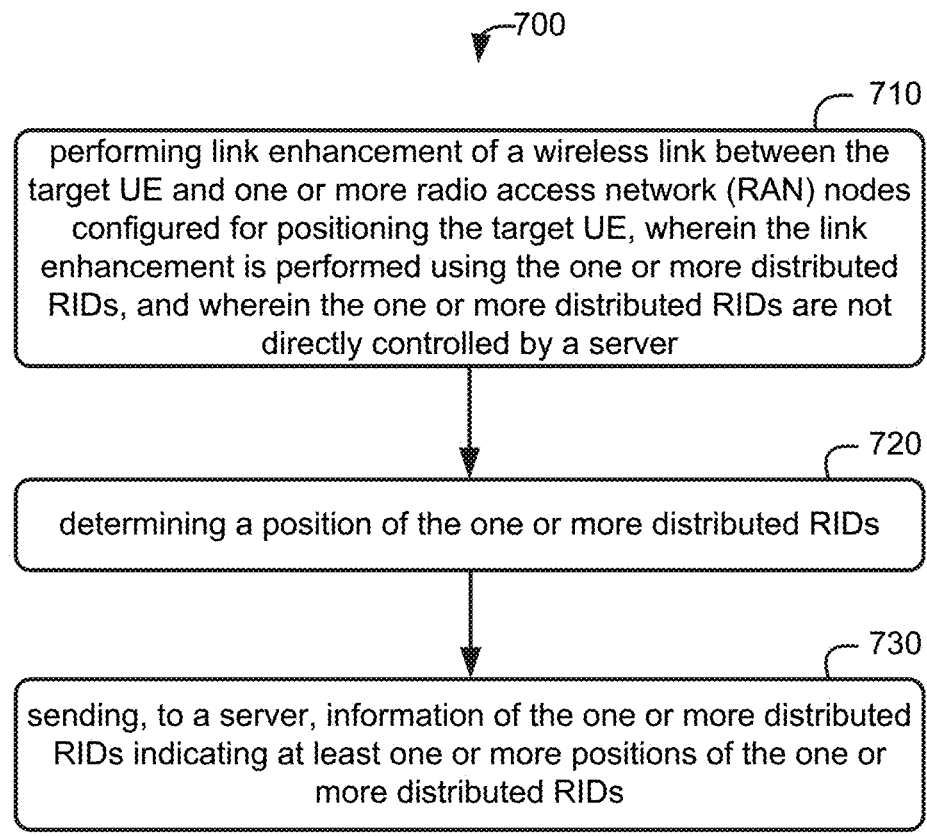
FIG. 7 is a flow diagram of a method for positioning of a target UE in the presence of one or more distributed RIDs, which is performed by the target UE, according to some embodiments.

FIG. 7 is a flow diagram of a method for positioning of a target UE in the presence of one or more distributed RID (e.g., one or more distributed RIDs 425 in FIG. 4 and/or one or more distributed RIDs 515 in FIG. 5), which is performed by the target UE, according to some embodiments. In some embodiments, the UE may correspond to UE 105 in FIG. 1, and/or target UE 505 in FIG. 5. Means/structure for performing the functionality illustrated in one or more of the blocks shown in FIG. 7 may be performed by hardware and/or software components of a UE, as described herein. Example components of a UE are illustrated in FIG. 10, which are described in more detail below.

At block 710, the functionality comprises performing link enhancement of a wireless link between the target UE and one or more radio access network (RAN) nodes configured for positioning the target UE, wherein the link enhancement is performed using the one or more distributed RIDs, and wherein the one or more distributed RIDs are not directly controlled by a server.

Means for performing functionality at block 710 may comprise a bus 805, processor(s) 810, wireless communication interface 830, memory 860, and/or other components of a UE 800, as illustrated in FIG. 8.

At block 720, the functionality comprises determining a position of the one or more distributed RIDs.

As noted above, the information of the distributed RID may include (1) the target UE is capable of controlling the distributed RID, (2) a unique ID associated with the distributed controller or the distributed RID, (3) an additional processing delay associated with the distributed RID, (4) a position information of the distributed RID, or any combination thereof.

Means for performing functionality at block 720 may comprise a bus 805, processor(s) 810, wireless communication interface 830, memory 860, and/or other components of a UE 800, as illustrated in FIG. 8.

At block 730, the functionality comprises sending, to a server, information of the one or more distributed RIDs indicating at least one or more positions of the one or more distributed RIDs.

Means for performing functionality at block 730 may comprise a bus 805, processor(s) 810, wireless communication interface 830, memory 860, and/or other components of a UE 800, as illustrated in FIG. 8.

In some embodiments, method 700 may further include receiving from the server, one or more RID configurations associated with one or more reference signals, wherein the one or more RID configurations are mapped to the information of the one or more distributed RIDs.

In some embodiments, the information of the one or more distributed RIDs comprises: absolute positions of the one or more distributed RIDs; relative positions of the one or more distributed RIDs with respect to the target UE; or any combination thereof.

In some embodiments, the information of the one or more distributed RIDs may indicate the target UE is capable of controlling the one or more distributed RIDs, scheduling information of the one or more distributed RIDs indicating time and frequency resources over which the one or more distributed RIDs are available for signal amplification or redirection, hardware capabilities of the one or more distributed RIDs, additional processing delays associated with the one or more distributed RIDs, whether the one or more distributed RIDs are available for uplink transmission or downlink transmission, relative mobility between the one or more distributed RIDs and the target UE, or any combination thereof.

In some embodiments, method 700 may further include transmitting to the server, downlink reference signal measurements, wherein each of the downlink reference signal measurements is associated with a notification indicating whether the one or more distributed RIDs are used during the downlink reference signal measurement, an estimate time delay associated with the downlink reference signal measurement, a receiver side beam over which the downlink reference signal measurement is received, or any combination thereof.

In some embodiments, method 700 may further include receiving from the server, a distributed RID configuration for positioning the target UE based at least in part on the information of the one or more distributed RIDs, wherein the distributed RID configuration indicates control information for the target UE to control the one or more distributed RIDs.

FIG. 8 is a block diagram of an embodiment of a UE 800, which can be utilized as described herein (e.g., in association with the previously described figures). In some embodiments, for example, the UE 800 may comprise, for example, a mobile (e.g., movable/portable) device (e.g., tablet, laptop, vehicle, etc.). It should be noted that FIG. 8 is meant only to provide a generalized illustration of various components, any or all of which may be utilized as appropriate.

The UE 800 is shown to comprise hardware elements that can be electrically coupled via a bus 805 (or may otherwise be in communication, as appropriate). The hardware elements may include a processor(s) 810 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 810 may comprise one or more processing units, which may be housed in a single integrated circuit (IC) or multiple Ics. As shown in FIG. 8, some embodiments may have a separate DSP 820, depending on desired functionality. Location determination and/or other determinations based on wireless communication may be provided in the processor(s) 810 and/or wireless communication interface 830 (discussed below). The UE 800 also can include one or more input devices 870, which can include without limitation one or more keyboards, touch screens, touch pads, microphones, buttons, dials, switches, and/or the like; and one or more output devices 815, which can include without limitation one or more displays (e.g., touch screens), light emitting diodes (LEDs), speakers, and/or the like.

The UE 800 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 800 to communicate with other devices as described in the embodiments above. The wireless communication interface 830 may permit data and signaling to be communicated (e.g., transmitted and received) with base stations of a network, for example, via eNBs, gNBs, ng-eNBs, access points, various base stations and/or other access node types, and/or other network components, computer systems, and/or any other electronic devices communicatively coupled with base stations, as described herein. The communication can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof. The antenna(s) 832 may be capable of transmitting and receiving wireless signals using beams (e.g., Tx beams and Rx beams). Beam formation may be performed using digital and/or analog beam formation techniques, with respective digital and/or analog circuitry. The wireless communication interface 830 may include such circuitry.

Depending on desired functionality, the wireless communication interface 830 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 800 may communicate with different data networks that may comprise various network types. For example, one such network type may comprise a wireless wide area network (WWAN), which may be a code-division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a WiMAX (IEEE 802.16) network, and so on. A CDMA network may implement one or more radio access technologies (RATs) such as CDMA2000®, wideband code division multiple access (WCDMA), and so on. CDMA2000® includes IS-95, IS-2000 and/or IS-856 standards. A TDMA network may implement global system for mobile communications (GSM), digital advanced mobile phone system (D-AMPS), or some other RAT. An OFDMA network may employ long-term evolution (LTE), LTE Advanced, fifth-generation (5G) new radio (NR), and so on. 5G NR, LTE, LTE Advanced, GSM, and WCDMA are described in documents from $3^{rd}$ Generation Partnership Project (3GPP). CDMA2000@ is described in documents from a consortium named "$3^{rd}$ Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 800 can further include sensor(s) 840. Sensor(s) 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 800 may further comprise a sensing unit 850. The sensing unit 850 may comprise hardware and/or software components capable of transmitting and/or receiving RF signals (e.g., RS) to detect one or more targets in the manner described herein. The sensing unit 850 may comprise a standalone component connected with a bus 805, as illustrated, or may be incorporated into another component (e.g., the wireless indication interface 830). Further, the sensing unit 850 may be communicatively coupled with an antenna 832, which it may share with the wireless communication interface 830. Additionally or alternatively, the sensing unit 850 may have its own antenna (not shown). In some embodiments, the sensing unit 850 may be communicatively coupled with multiple antennas or an antenna array capable of sending and/or receiving RF signals via directional beams.

Embodiments of the UE 800 may also include a Global Navigation Satellite System (GNSS) receiver 880 capable of receiving signals 884 from one or more GNSS satellites using an antenna 882 (which could be the same as antenna 832). Positioning based on GNSS signal measurement can be utilized to complement and/or incorporate the techniques described herein. The GNSS receiver 880 can extract a position of the UE 800, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 880 is illustrated in FIG. 8 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 810, DSP 820, and/or a processor within the wireless communication interface 830 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 810 or DSP 820.

The UE 800 may further include and/or be in communication with a memory 860. The memory 860 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the UE 800 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the UE 800 (and/or processor(s) 810 or DSP 820 within UE 800). In some embodiments, then, such code and/or instructions can be used to configure and/or adapt a general-purpose computer (or other devices) to perform one or more operations in accordance with the described methods.

FIG. 9 is a block diagram of an embodiment of a computer system 900, which may be used, in whole or in part, to provide the functions of one or more components and/or devices as described in the embodiments herein, including a server (e.g., sensing server/SMF, location server/LMF, etc.) in communication with one or more base stations and/or one or more sensing nodes to coordinate RF sensing as described in embodiments herein. This may include, for example, a computer server, personal computer, personal electronic device, or the like. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different geographical locations.

The computer system 900 is shown comprising hardware elements that can be electrically coupled via a bus 905 (or may otherwise be in communication, as appropriate). The hardware elements may include processor(s) 910, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 900 also may comprise one or more input devices 915, which may comprise without limitation a mouse, a keyboard, a camera, a microphone, and/or the like; and one or more output devices 920, which may comprise without limitation a display device, a printer, and/or the like.

The computer system 900 may further include (and/or be in communication with) one or more non-transitory storage devices 925, which can comprise, without limitation, local and/or network accessible storage, and/or may comprise, without limitation, a disk drive, a drive array, an optical storage device, a solid-state storage device, such as a random-access memory (RAM) and/or read-only memory (ROM), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 900 may also include a communications subsystem 930, which may comprise wireless communication technologies managed and controlled by a wireless communication interface 933, as well as wired technologies (such as Ethernet, coaxial communications, universal serial bus (USB), and the like). The wireless communication interface 933 may comprise one or more wireless transceivers that may send and receive wireless signals 955 (e.g., signals according to 5G NR or LTE) via wireless antenna(s) 950. Thus the communications subsystem 930 may comprise a modem, a network card (wireless or wired), an infrared communication device, a wireless communication device, and/or a chipset, and/or the like, which may enable the computer system 900 to communicate on any or all of the communication networks described herein to any device on the respective network, including a User Equipment (UE), base stations and/or other transmission reception points (TRPs), and/or any other electronic devices described herein. Hence, the communications subsystem 930 may be used to receive and send data as described in the embodiments herein.

In many embodiments, the computer system 900 will further comprise a working memory 935, which may comprise a RAM or ROM device, as described above. Software elements, shown as being located within the working memory 935, may comprise an operating system 940, device drivers, executable libraries, and/or other code, such as one or more applications 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. An example method of positioning of a target UE in a presence of one or more RIDs, the method performed by a server and may comprise receiving, from the target UE, information of the one or more distributed RIDs indicating at least one or more positions of the one or more distributed RIDs, wherein the one or more distributed RIDs are used for link enhancement of a wireless link between the target UE and one or more radio access network (RAN) nodes configured for positioning the target UE, and wherein the one or more distributed RIDs are not directly controlled by the server. The method may also comprise positioning the target UE based at least in part on the information of the one or more distributed RIDs.

Clause 2. The method of the clause 1, wherein positioning the target UE further comprises: obtaining one or more link measurements of the wireless link; initiating a uplink positioning session by determining one or more sounding reference signal (SRS) configurations based on: the information of the one or more distributed RIDs; the one or more link measurements; capabilities of the target UE; or any combination thereof; sending a message indicating the one or more SRS configurations to the one or more RAN nodes.

Clause 3. The method of any of clause 1 or 2, wherein the message further indicates: receiver configurations corresponding to the one or more SRS configurations.

Clause 4. The method of any of clauses 1-3, wherein the message further indicates: an association between one or more reference signals and the one or more SRS configurations, determined based at least in part on the capabilities of the target UE.

Clause 5. The method of any of clauses 1-4 further comprising: associating multiple SRS configurations to a reference signal index, wherein at least one of the multiple SRS configurations includes an indication to combine measurements from multiple resources allocated to the reference signal index.

Clause 6. The method of any of clauses 1-5, further comprising: transmitting to the target UE, one or more RID configurations associated with the one or more reference signals, wherein the one or more RID configurations are mapped to the information of the one or more distributed RIDs received from the UE.

Clause 7. The method of any of clauses 1-6, wherein the information of the one or more distributed RIDs comprises: absolute positions of the one or more distributed RIDs; relative positions of the one or more distributed RIDs with respect to the target UE; or any combination thereof.

Clause 8. The method of any of clauses 1-7, wherein the information of the one or more distributed RIDs indicates: the target UE is capable of controlling the one or more distributed RIDs; scheduling information of the one or more distributed RIDs indicating time and frequency resources over which the one or more distributed RIDs are available for signal amplification or redirection; hardware capabilities of the one or more distributed RIDs; additional processing delays associated with the one or more distributed RIDs; whether the one or more distributed RIDs are available for uplink transmission or downlink transmission; relative mobility between the one or more distributed RIDs and the target UE; or any combination thereof.

Clause 9. The method of any of clauses 1-8, further comprising: receiving from the one or more RAN nodes additional information of the one or more distributed RIDs indicating updated positions of the one or more distributed RIDs.

Clause 10. The method of any of clauses 1-9, further comprising: receiving from the target UE, downlink reference signal measurements, wherein each of the downlink reference signal measurements is associated with a notification indicating: whether the one or more distributed RIDs are used during the downlink reference signal measurement; an estimate time delay associated with the downlink reference signal measurement; a receiver side beam over which the downlink reference signal measurement is received; or any combination thereof.

Clause 11. The method of any of clauses 1-10, wherein positioning the target UE further comprises: determining a distributed RID configuration for positioning the target UE based at least in part on the information of the one or more distributed RIDs, wherein the distributed RID configuration indicates control information for the target UE to control the one or more distributed RIDs; and sending to the target UE the distributed RID configuration for positioning the target UE.

Clause 12. An example method of positioning of a target UE in a presence of one or more RIDs, the method performed by the target UE and may comprise performing link enhancement of a wireless link between the target UE and one or more radio access network (RAN) nodes configured for positioning the target UE, wherein the link enhancement is performed using the one or more distributed RIDs, and wherein the one or more distributed RIDs are not directly controlled by a server. The method may also comprise determining a position of the one or more distributed RIDs. The method may further comprise sending, to a server, information of the one or more distributed RIDs indicating at least one or more positions of the one or more distributed RIDs.

Clause 13. The method of the clause 12, further comprising: receiving from the server, one or more RID configurations associated with one or more reference signals, wherein the one or more RID configurations are mapped to the information of the one or more distributed RIDs.

Clause 14. The method of any of clause 12 or 13, wherein the information of the one or more distributed RIDs comprises: absolute positions of the one or more distributed RIDs; relative positions of the one or more distributed RIDs with respect to the target UE; or any combination thereof.

Clause 15. The method of any of clauses 12-14, wherein the information of the one or more distributed RIDs indicates: the target UE is capable of controlling the one or more distributed RIDs; scheduling information of the one or more distributed RIDs indicating time and frequency resources over which the one or more distributed RIDs are available for signal amplification or redirection; hardware capabilities of the one or more distributed RIDs; additional processing delays associated with the one or more distributed RIDs; whether the one or more distributed RIDs are available for uplink transmission or downlink transmission; relative mobility between the one or more distributed RIDs and the target UE; or any combination thereof.

Clause 16. The method of any of clauses 12-15, further comprising: transmitting to the server, downlink reference signal measurements, wherein each of the downlink reference signal measurements is associated with a notification indicating: whether the one or more distributed RIDs are used during the downlink reference signal measurement; an estimate time delay associated with the downlink reference signal measurement; a receiver side beam over which the downlink reference signal measurement is received; or any combination thereof.

Clause 17. The method of any of clauses 12-16, further comprising: receiving from the server, a distributed RID configuration for positioning the target UE based at least in part on the information of the one or more distributed RIDs, wherein the distributed RID configuration indicates control information for the target UE to control the one or more distributed RIDs.

Clause 18. An example server for positioning of a target UE in a presence of one or more distributed RIDs comprising one or more transceivers, one or more memories, and one or more processors communicatively coupled with the one or more transceivers and the memories. The one or more processors may be configured to receive, from the target UE, information of the one or more distributed RIDs indicating at least one or more positions of the one or more distributed RIDs, wherein the one or more distributed RIDs are used for link enhancement of a wireless link between the target UE and one or more radio access network (RAN) nodes configured for positioning the target UE, and wherein the one or more distributed RIDs are not directly controlled by the server. The one or more processors may also be configured to position the target UE based at least in part on the information of the one or more distributed RIDs.

Clause 19. The server of the clause 18, wherein the one or more processors are further configured to: obtain one or more link measurements of the wireless link; initiate a uplink positioning session by determining one or more sounding reference signal (SRS) configurations based on: the information of the one or more distributed RIDs; the one or more link measurements; capabilities of the target UE; or any combination thereof; send a message indicating the one or more SRS configurations to the one or more RAN nodes.

Clause 20. The server of any of clause 18 or 19, wherein the message further indicates: receiver configurations corresponding to the one or more SRS configurations.

Clause 21. The server of any of clauses 18-20, wherein the message further indicates: an association between one or more reference signals and the one or more SRS configurations, determined based at least in part on the capabilities of the target UE.

Clause 22. The server of any of clauses 18-21, wherein the one or more processors are further configured to: associate multiple SRS configurations to a reference signal index, wherein at least one of the multiple SRS configurations includes an indication to combine measurements from multiple resources allocated to the reference signal index.

Clause 23. The server of any of clauses 18-22, wherein the one or more processors are further configured to: transmit to the target UE, one or more RID configurations associated with the one or more reference signals, wherein the one or more RID configurations are mapped to the information of the one or more distributed RIDs received from the UE.

Clause 24. The server of any of clauses 18-23, wherein the information of the one or more distributed RIDs comprises: absolute positions of the one or more distributed RIDs; relative positions of the one or more distributed RIDs with respect to the target UE; or any combination thereof.

Clause 25. The server of any of clauses 18-24, wherein the information of the one or more distributed RIDs indicates: the target UE is capable of controlling the one or more distributed RIDs; scheduling information of the one or more distributed RIDs indicating time and frequency resources over which the one or more distributed RIDs are available for signal amplification or redirection; hardware capabilities of the one or more distributed RIDs; additional processing delays associated with the one or more distributed RIDs; whether the one or more distributed RIDs are available for uplink transmission or downlink transmission; relative mobility between the one or more distributed RIDs and the target UE; or any combination thereof.

Clause 26. The server of any of clauses 18-25, wherein the one or more processors are further configured to: receive from the one or more RAN nodes additional information of the one or more distributed RIDs indicating updated positions of the one or more distributed RIDs.

Clause 27. An example target UE for positioning in a presence of one or more RIDs comprising one or more transceivers, one or more memories, and one or more processors communicatively coupled with the one or more transceivers and the memories. The one or more processors may be configured to perform link enhancement of a wireless link between the target UE and one or more radio access network (RAN) nodes configured for positioning the target UE, wherein the link enhancement is performed using the one or more distributed RIDs, and wherein the one or more distributed RIDs are not directly controlled by a server. The one or more processors may also be configured to determine one or more positions of the one or more distributed RIDs. The one or more processors may further be configured to send, to a server, information of the one or more distributed RIDs indicating at least one or more positions of the one or more distributed RIDs.

Clause 28. The target UE of the clause 27, wherein the one or more processors are further configured to: receive from the server, one or more RID configurations associated with one or more reference signals, wherein the one or more RID configurations are mapped to the information of the one or more distributed RIDs.

Clause 29. The target UE of any of clause 27 or 28, wherein the one or more processors are further configured to: transmit, to the server, additional information indicating a position measurement performed based on the distributed RID, wherein the first RID configuration is determined at least based on the additional information.

Clause 30. The target UE of any of clauses 27-29, wherein the information of the one or more distributed RIDs comprises: absolute positions of the one or more distributed RIDs; relative positions of the one or more distributed RIDs with respect to the target UE; or any combination thereof.

What is claimed is:

1. A method of positioning of a target User Equipment (UE) in a presence of one or more distributed reconfigurable intelligent devices (RIDs), the method performed by a server and comprising:
   receiving, from the target UE, information of the one or more distributed RIDs indicating at least one or more positions of the one or more distributed RIDs, wherein the one or more distributed RIDs are used for link enhancement of a wireless link between the target UE and one or more radio access network (RAN) nodes configured for positioning the target UE, and wherein the one or more distributed RIDs are not directly controlled by the server; and
   positioning the target UE based at least in part on the information of the one or more distributed RIDs.

2. The method of claim 1, wherein positioning the target UE further comprises:
   obtaining one or more link measurements of the wireless link;
   initiating a uplink positioning session by determining one or more sounding reference signal (SRS) configurations based on:
     the information of the one or more distributed RIDs;
     the one or more link measurements;
     capabilities of the target UE; or
     any combination thereof; and
   sending a message indicating the one or more SRS configurations to the one or more RAN nodes.

3. The method of claim 2, wherein the message further indicates:
   receiver configurations corresponding to the one or more SRS configurations.

4. The method of claim 2, wherein the message further indicates:
   an association between one or more reference signals and the one or more SRS configurations, determined based at least in part on the capabilities of the target UE.

5. The method of claim 4, further comprising:
   associating multiple SRS configurations to a reference signal index, wherein at least one of the multiple SRS configurations includes an indication to combine measurements from multiple resources allocated to the reference signal index.

6. The method of claim 5, further comprising:
   transmitting to the target UE, one or more RID configurations associated with the one or more reference signals, wherein the one or more RID configurations are mapped to the information of the one or more distributed RIDs received from the UE.

7. The method of claim 1, wherein the information of the one or more distributed RIDs comprises:

absolute positions of the one or more distributed RIDs;
relative positions of the one or more distributed RIDs with respect to the target UE; or
any combination thereof.

8. The method of claim 1, wherein the information of the one or more distributed RIDs indicates:
the target UE is capable of controlling the one or more distributed RIDs;
scheduling information of the one or more distributed RIDs indicating time and frequency resources over which the one or more distributed RIDs are available for signal amplification or redirection;
hardware capabilities of the one or more distributed RIDs;
additional processing delays associated with the one or more distributed RIDs;
whether the one or more distributed RIDs are available for uplink transmission or downlink transmission;
relative mobility between the one or more distributed RIDs and the target UE; or
any combination thereof.

9. The method of claim 1, further comprising:
receiving from the one or more RAN nodes additional information of the one or more distributed RIDs indicating updated positions of the one or more distributed RIDs.

10. The method of claim 1, further comprising:
receiving from the target UE, downlink reference signal measurements, wherein each of the downlink reference signal measurements is associated with a notification indicating:
whether the one or more distributed RIDs are used during the downlink reference signal measurement;
an estimate time delay associated with the downlink reference signal measurement;
a receiver side beam over which the downlink reference signal measurement is received; or
any combination thereof.

11. The method of claim 1, wherein positioning the target UE further comprises:
determining a distributed RID configuration for positioning the target UE based at least in part on the information of the one or more distributed RIDs, wherein the distributed RID configuration indicates control information for the target UE to control the one or more distributed RIDs; and
sending to the target UE the distributed RID configuration for positioning the target UE.

12. The method of claim 1, further comprising:
receiving from the server, a distributed RID configuration for positioning the target UE based at least in part on the information of the one or more distributed RIDs, wherein the distributed RID configuration indicates control information for the target UE to control the one or more distributed RIDs.

13. A method for positioning of a target User Equipment (UE) in a presence of one or more distributed reconfigurable intelligent devices (RIDs), the method performed by the target UE and comprising:
performing link enhancement of a wireless link between the target UE and one or more radio access network (RAN) nodes configured for positioning the target UE, wherein the link enhancement is performed using the one or more distributed RIDs, and wherein the one or more distributed RIDs are not directly controlled by a server;
determining one or more positions of the one or more distributed RIDs; and
sending, to a server, information of the one or more distributed RIDs indicating at least one of the one or more positions of the one or more distributed RIDs.

14. The method of claim 13, further comprising:
receiving from the server, one or more RID configurations associated with one or more reference signals, wherein the one or more RID configurations are mapped to the information of the one or more distributed RIDs.

15. The method of claim 13, wherein the information of the one or more distributed RIDs comprises:
absolute positions of the one or more distributed RIDs;
relative positions of the one or more distributed RIDs with respect to the target UE; or
any combination thereof.

16. The method of claim 13, wherein the information of the one or more distributed RIDs indicates:
the target UE is capable of controlling the one or more distributed RIDs;
scheduling information of the one or more distributed RIDs indicating time and frequency resources over which the one or more distributed RIDs are available for signal amplification or redirection;
hardware capabilities of the one or more distributed RIDs;
additional processing delays associated with the one or more distributed RIDs;
whether the one or more distributed RIDs are available for uplink transmission or downlink transmission;
relative mobility between the one or more distributed RIDs and the target UE; or
any combination thereof.

17. The method of claim 13, further comprising:
transmitting to the server, downlink reference signal measurements, wherein each of the downlink reference signal measurements is associated with a notification indicating:
whether the one or more distributed RIDs are used during the downlink reference signal measurement;
an estimate time delay associated with the downlink reference signal measurement;
a receiver side beam over which the downlink reference signal measurement is received; or
any combination thereof.

18. A server for positioning of a target User Equipment (UE) in a presence of one or more distributed reconfigurable intelligent devices (RIDs), comprising:
one or more transceivers;
one or more memories; and
one or more processors communicatively coupled with the one or more transceivers and the one or more memories, wherein the one or more processors are configured to:
receive, from the target UE, information of the one or more distributed RIDs indicating at least one or more positions of the one or more distributed RIDs, wherein the one or more distributed RIDs are used for link enhancement of a wireless link between the target UE and one or more radio access network (RAN) nodes configured for positioning the target UE, and wherein the one or more distributed RIDs are not directly controlled by the server; and
position the target UE based at least in part on the information of the one or more distributed RIDs.

19. The server of claim 18, wherein the one or more processors are further configured to:
obtain one or more link measurements of the wireless link;

initiate a uplink positioning session by determining one or more sounding reference signal (SRS) configurations based on:
  the information of the one or more distributed RIDs;
  the one or more link measurements;
  capabilities of the target UE; or
  any combination thereof; and
send a message indicating the one or more SRS configurations to the one or more RAN nodes.

20. The server of claim 19, wherein the message further indicates:
  receiver configurations corresponding to the one or more SRS configurations.

21. The server of claim 19, wherein the message further indicates:
  an association between one or more reference signals and the one or more SRS configurations, determined based at least in part on the capabilities of the target UE.

22. The server of claim 21, wherein the one or more processors are further configured to:
  associate multiple SRS configurations to a reference signal index, wherein at least one of the multiple SRS configurations includes an indication to combine measurements from multiple resources allocated to the reference signal index.

23. The server of claim 22, wherein the one or more processors are further configured to:
  transmit to the target UE, one or more RID configurations associated with the one or more reference signals, wherein the one or more RID configurations are mapped to the information of the one or more distributed RIDs received from the UE.

24. The server of claim 18, wherein the information of the one or more distributed RIDs comprises:
  absolute positions of the one or more distributed RIDs;
  relative positions of the one or more distributed RIDs with respect to the target UE; or
  any combination thereof.

25. The server of claim 18, wherein the information of the one or more distributed RIDs indicates:
  the target UE is capable of controlling the one or more distributed RIDs;
  scheduling information of the one or more distributed RIDs indicating time and frequency resources over which the one or more distributed RIDs are available for signal amplification or redirection;
  hardware capabilities of the one or more distributed RIDs;
  additional processing delays associated with the one or more distributed RIDs;
  whether the one or more distributed RIDs are available for uplink transmission or downlink transmission;
  relative mobility between the one or more distributed RIDs and the target UE; or
  any combination thereof.

26. The server of claim 18, wherein the one or more processors are further configured to:
  receive from the one or more RAN nodes additional information of the one or more distributed RIDs indicating updated positions of the one or more distributed RIDs.

27. A target User Equipment (UE) for positioning in a presence of one or more distributed reconfigurable intelligent devices (RIDs), comprising:
  one or more transceivers;
  one or more memories; and
  one or more processors communicatively coupled with the one or more transceivers and the one or more memories, wherein the one or more processors are configured to:
    perform link enhancement of a wireless link between the target UE and one or more radio access network (RAN) nodes configured for positioning the target UE, wherein the link enhancement is performed using the one or more distributed RIDs, and wherein the one or more distributed RIDs are not directly controlled by a server;
    determine one or more positions of the one or more distributed RIDs; and
    send, to a server, information of the one or more distributed RIDs indicating at least one of the one or more positions of the one or more distributed RIDs.

28. The target UE of claim 27, wherein the one or more processors are further configured to:
  receive from the server, one or more RID configurations associated with one or more reference signals, wherein the one or more RID configurations are mapped to the information of the one or more distributed RIDs.

29. The target UE of claim 27, wherein the one or more processors are further configured to:
  transmit, to the server, additional information indicating a position measurement performed based on the distributed RID, wherein the first RID configuration is determined at least based on the additional information.

30. The target UE of claim 27, wherein the information of the one or more distributed RIDs comprises:
  absolute positions of the one or more distributed RIDs;
  relative positions of the one or more distributed RIDs with respect to the target UE; or any combination thereof.

* * * * *